(12) United States Patent
Lee

(10) Patent No.: US 7,701,657 B2
(45) Date of Patent: Apr. 20, 2010

(54) HIGH-DENSITY RECORDING METHOD FOR HARD DISK DRIVES AND A PRE-AMPLIFIER CIRCUIT SUITABLE FOR USE WITH SAME

(75) Inventor: Chul-woo Lee, Seongnam-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 485 days.

(21) Appl. No.: 11/700,836

(22) Filed: Feb. 1, 2007

(65) Prior Publication Data
US 2007/0183072 A1 Aug. 9, 2007

(30) Foreign Application Priority Data
Feb. 3, 2006 (KR) .................. 10-2006-0010581

(51) Int. Cl.
*G11B 5/02* (2006.01)
(52) U.S. Cl. .......................... 360/68; 360/48
(58) Field of Classification Search ................ None
See application file for complete search history.

(56) References Cited

U.S. PATENT DOCUMENTS 4,237,496 A * 12/1980 De Niet ................... 360/40
4,482,927 A * 11/1984 Melbye et al. ............ 360/40
4,566,044 A  1/1986 Langdon, Jr. et al.
5,621,580 A  4/1997 Cruz et al.

FOREIGN PATENT DOCUMENTS

| JP | 1992245044 A | 9/1992 |
|---|---|---|
| JP | 07-202709 | 8/1995 |
| JP | 09-017057 | 1/1997 |
| JP | 2002-208229 | 7/2002 |
| KR | 1020020034349 | 5/2002 |

\* cited by examiner

*Primary Examiner*—Jason C Olson
(74) *Attorney, Agent, or Firm*—Volentine & Whitt, PLLC

(57) ABSTRACT

A magnetic recording method is provided where ternary data is recorded on a magnetic recording medium by forming a first area that corresponds to a first value of the data and in which a first magnetization state is continued at least during the minimum write width. A second area that corresponds to a second value of the data in which a second magnetization state is oppositely magnetized as compared with the first magnetization state is continued at least during the minimum write width. A third area that corresponds to a third value of the data in which the magnetic intensity detected by the read head corresponds to a "0." Accordingly, the ternary data can be recorded using the characteristic that a signal having a width narrower than the detection width of the read head is not detected by the read head.

8 Claims, 7 Drawing Sheets

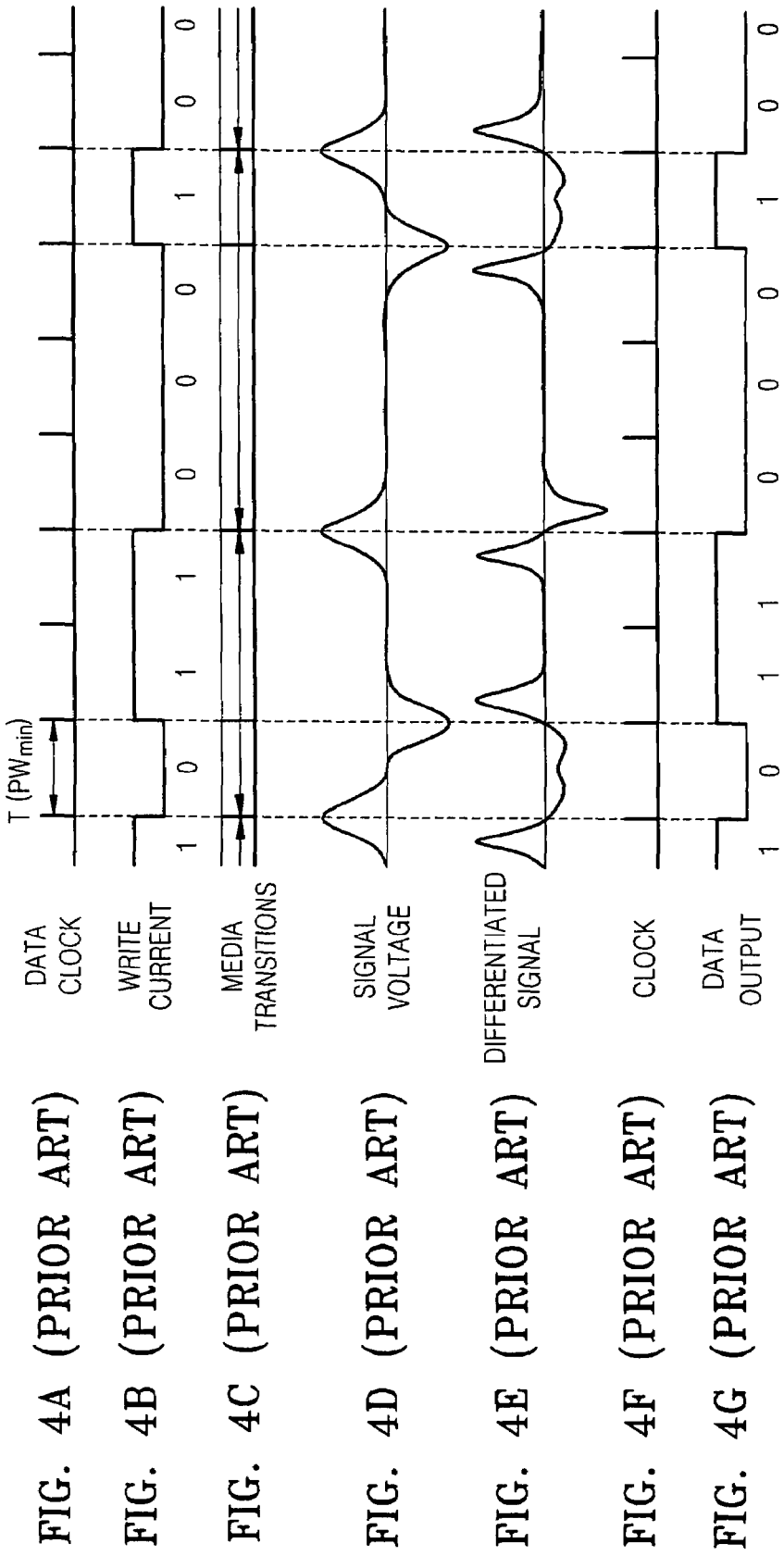

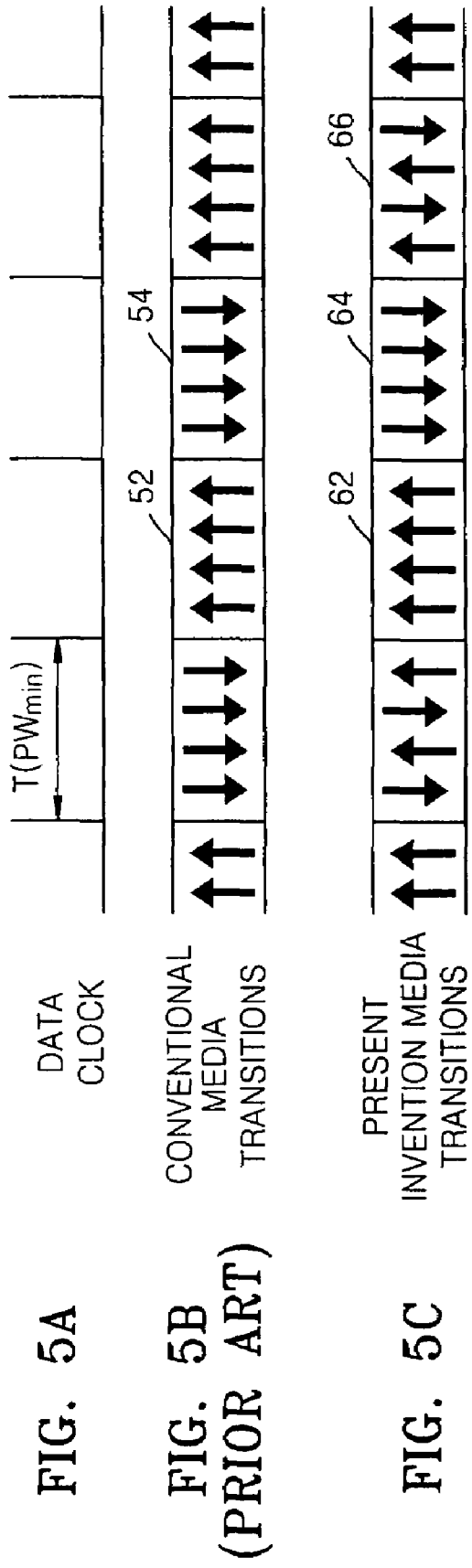

HIGH-DENSITY RECORDING METHOD FOR HARD DISK DRIVES AND A PRE-AMPLIFIER CIRCUIT SUITABLE FOR USE WITH SAME

BACKGROUND OF THE INVENTION

1. Field of the Invention

The present invention relates to a magnetic recording method in which data is recorded by changing a magnetization state of a magnetic recording medium, and more particularly, to a magnetic recording method for recording ternary data using a characteristic of a read head, a pre-amplifier circuit, and a magnetic recording apparatus utilizing same.

This application claims the benefit of Korean Patent Application No. 10-2006-0010581, filed on Feb. 3, 2006, in the Korean Intellectual Property Office, the disclosure of which is incorporated herein in its entirety by reference.

2. Discussion of Related Art

Hard disk drives (HDDs) are recording devices used to store binary information on concentric tracks of a magnetic disk. The disk is rotatably mounted on a spindle motor, and information is accessed by a head attached to an actuator or flexure arm rotated by a voice coil motor (VCM). The VCM rotates the actuator by a VCM driving current, thereby moving the head across the surface of the disk.

The head reads information recorded on the surface of the disk by sensing a magnetic field on the surface or writes information on the disk by magnetizing the surface of the disk. A write current is supplied to the head to write the data, thereby generating a magnetic field from the head. In an HDD using a longitudinal recording method, a magnetic disk is magnetized in one of two opposite directions along the centerline of each track. In a perpendicular recording method, a magnetic disk is magnetized in one of up and down directions along a perpendicular line to the surface of the disk.

FIG. 1 is a plan view of a conventional HDD 100 that includes at least one disk 12 rotated by a spindle motor 14 and at least one head 16 located above the surface of the disk 12. Head 16 can read or write information from or to disk 12 by sensing a magnetic field on the surface of the disk 12 or by magnetizing the surface of the disk 12. Head 16 includes a write head for magnetizing disk 12 and a separate read head for sensing a magnetic field on disk 12. The head 16 is mounted on a slider (not shown) combined with suspension arm 20. The slider generates air between head 16 and the surface of disk 12 to maintain head 16 a distance above the disk. Suspension 20 is combined with a head stack assembly (HSA) 22 which is attached to an actuator arm 24 having a voice coil 26. Voice coil 26 is located adjacent to magnetic assembly 28 supporting VCM 30 that supplies a driving current supplied to the voice coil 26 to generate a torque to rotate actuator arm 24 around a bearing assembly 32. The rotation of the actuator arm 24 moves head 16 across the surface of disk 12.

FIG. 2 is a schematic diagram illustrating a conventional perpendicular recording method. Head 16 includes a write head 33 recording a signal in a recording layer 36 using a magnetic induction method and a read head 34 reading an electrical signal from the recording layer 36 of disk 12. Write head 33 records a signal by applying a magnetic field in the perpendicular direction corresponding to binary values (i.e. 0 and 1) of data to be recorded to recording layer 36. The magnetization states of recording layer 36 are illustrated using up arrows and down arrows. For example, recording layer 36 may have a magnetization state (a first magnetization state) indicated by an up arrow and a magnetization state (a second magnetization state) indicated by a down arrow. Read head 34 generates an electrical signal by detecting the magnetic flux density and direction of the recorded signal on layer 36. Read head 34 may be, for example, giant magnetic resistive (GMR) head and a tunneling magnetic resistive (TuMR) head.

FIG. 3 is a graph showing a correlation between the detection width PW50 of the read head 34 and the minimum write width $PW_{min}$ and shows a read signal corresponding to the minimum write width $PW_{min}$. The detection width PW50 of read head 34 is designed to be narrower than the minimum write width $PW_{min}$ of a recorded signal on recording layer 36 of disk 12 (i.e., the minimum length with which the signal is recorded on the surface of the disk), because the intensity and direction of magnetic flux cannot be detected by read head 34 if the detection width PW50 of read head 34 is wider than the minimum write width $PW_{min}$. In particular, detection width PW50 of read head 34 is indicated by a pulse width having a magnitude corresponding to 50% of the peak intensity of a read signal corresponding to the minimum write width $PW_{min}$. The detection width PW50 is defined as a distance PW50 (pulse width at 50% of peak intensity) between a position corresponding to 50% of the peak intensity in the rising edge and a position corresponding to 50% of the peak intensity in the falling edge of the read signal. Thus, a correlation of $PW50<PW_{min}$ is satisfied and the recording density of an HDD is determined by the detection width PW50 of read head 34.

FIGS. 4A through 4G are signal diagrams to illustrate a write/read process in a conventional HDD using the longitudinal recording method where, FIG. 4B shows a write current, FIG. 4C shows a magnetization transition state of the recording layer 36, FIG. 4D shows a read signal detected by the read head 34, FIG. 4E shows a differentiated signal obtained by performing differential of first order for the read signal of FIG. 4D, FIG. 4F shows a clock signal, and FIG. 4G shows a data output.

FIG. 4A shows a data clock where period T is determined by the minimum write width $PW_{min}$ and the detection width PW50 of read head 34. The write current illustrated in FIG. 4B generates a magnetic field corresponding to data to be recorded on the disk surface. A current in a forward direction (first direction), which has a predetermined magnitude, is applied to write head 33 during a period indicated by "1," and a current in a reverse direction (second direction) opposite to the first direction is applied to write head 33 during a period indicated by "0." Thus, opposite magnetic fields are generated from write head 33 by currents in the forward and reverse directions.

The recording layer 36 of the disk 12 is magnetized by the magnetic fields generated by write head 33 as illustrated in FIG. 4C. For example, recording layer 36 is consecutively magnetized in the forward direction during a period in which data has a value of "1" and in the reverse direction during a period in which data has a value of "0." The length of the period in which data has a "1" or "0" is at least greater than the minimum write width $PW_{min}$ (commonly, in 1 T to 11 T, T denotes the period of the data clock. The magnetization state of recording layer 36 is detected by read head 34. The read signal is reversed at a position (a transition position) at which the magnetization state of recording layer 36 is reversed. Thus, the transition position can be detected from a zero crossing point of the differentiated signal illustrated in FIG. 4E obtained by differentiating the read signal illustrated in FIG. 4D. That is, the data output illustrated in FIG. 4G can be obtained by waveform shaping the differentiated signal illustrated in FIG. 4E and sampling the waveform-shaped differentiated signal by synchronizing it with the clock signal illustrated in FIG. 4F which has the same period T of the data clock.

In conventional recording methods describing above, the recording layer 36 of the disk 12 is consecutively magnetized in the right (forward) or left (reverse) direction during at least the minimum write width $PW_{min}$. That is, for the recording layer 36, areas corresponding to the minimum write width $PW_{min}$ can have only a magnetization state of the forward or reverse direction. Thus, a drawback in conventional recording methods is that an increase in recording density can only be achieved by a decrease in the minimum write width $PW_{min}$ (i.e., improvement of the detection width of read head 34 or improvement of the quality of disk 12). Thus, data cannot be recorded with recording density higher than that determined by the detection width of the read head 34.

SUMMARY OF THE INVENTION

The present invention provides a magnetic recording method and apparatus for increasing the recording density by increasing a coding efficiency by recording ternary data. The present invention also provides a pre-amplifier circuit suitable for the magnetic recording method. According to an aspect of the present invention, a magnetic recording method for recording data is provided having a minimum write width corresponding to at least the detection width of a read head. The recording method comprises recording ternary data in a first area on a magnetic recording medium corresponding to a first data value. The recorded data in the first area has a first magnetization state which continues at least during the minimum write width. Ternary data is also recorded in a second area on the magnetic recording medium corresponding to a second data value. The data recorded in the second area having a second magnetization state which continues at least during said minimum write width. The second magnetization state is oppositely magnetized from the first magnetization state. Ternary data is further recorded in a third area on the magnetic recording medium corresponding to a third data value. The data recorded in the third area has a "0" value magnetic intensity detected by the read head.

A pre-amplifier circuit is also provided in which a write current is applied to a write head to record data having a minimum write width corresponding to at least a detection width of a read head, the pre-amplifier circuit comprising a direct current (DC) signal generator generating a DC signal having a predetermined amplitude; a first switch circuit for applying the DC signal from said DC generator to the write head in a first direction during a period in which the data to be recorded has a first value; a second switch circuit for applying the DC signal from said DC generator to the write head in a second direction opposite to the first direction during a period in which the data to be recorded has a second value; a high frequency signal generator generating a high frequency signal having a higher frequency than a write frequency corresponding to the minimum write width; and a third switch circuit for applying the high frequency signal to the write head during a period in which the data to be recorded has a third value.

BRIEF DESCRIPTION OF THE DRAWINGS

FIGS. 4A through 4G are diagrams for explaining a write/read process in a conventional HDD;
FIGS. 5A through 5C are diagrams for explaining a recording method according to an embodiment of the present invention.

DESCRIPTION OF EMBODIMENTS

Figure 1:
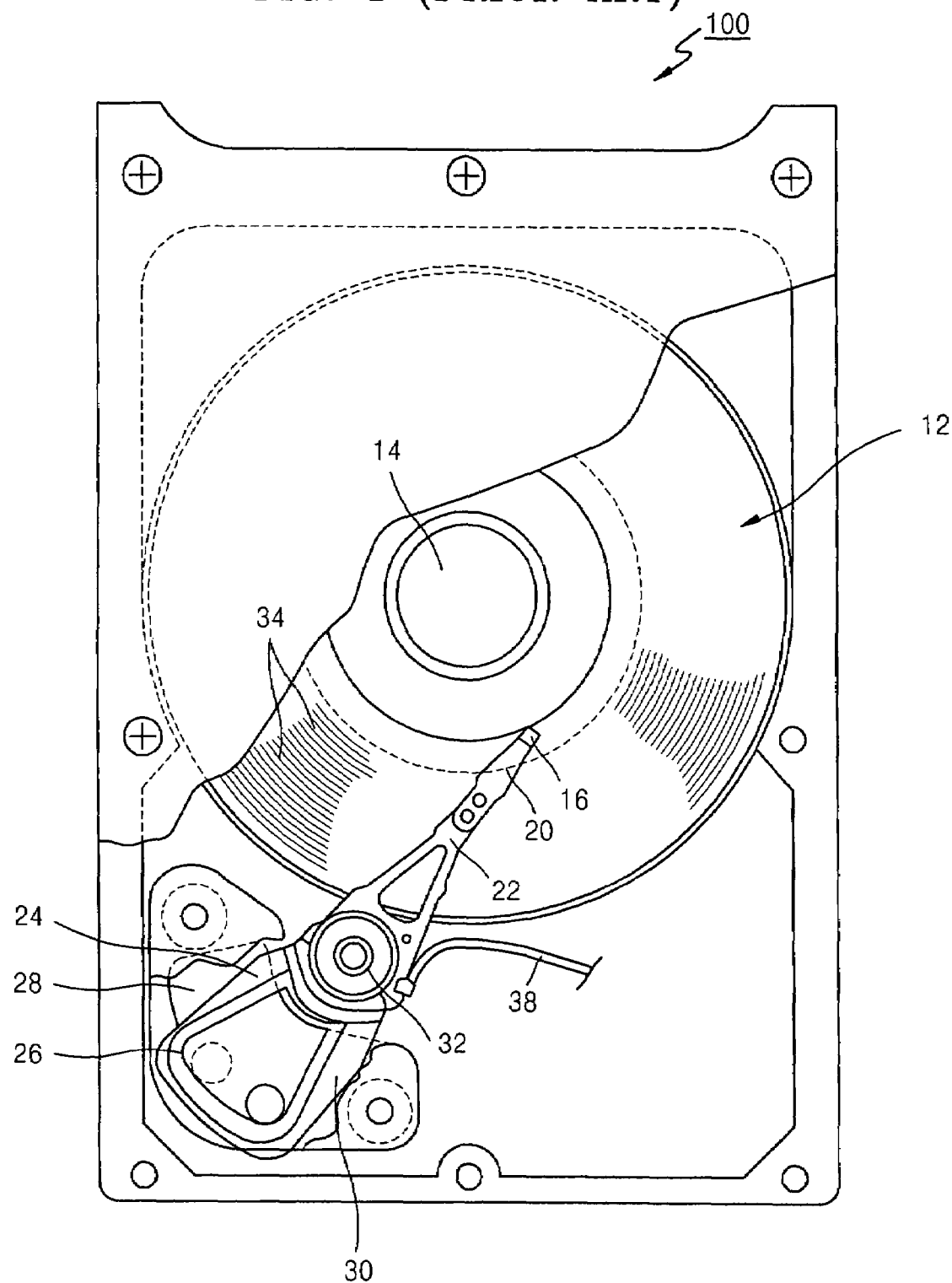
FIG. 1 is a plan view of a conventional HDD.
Figure 2:
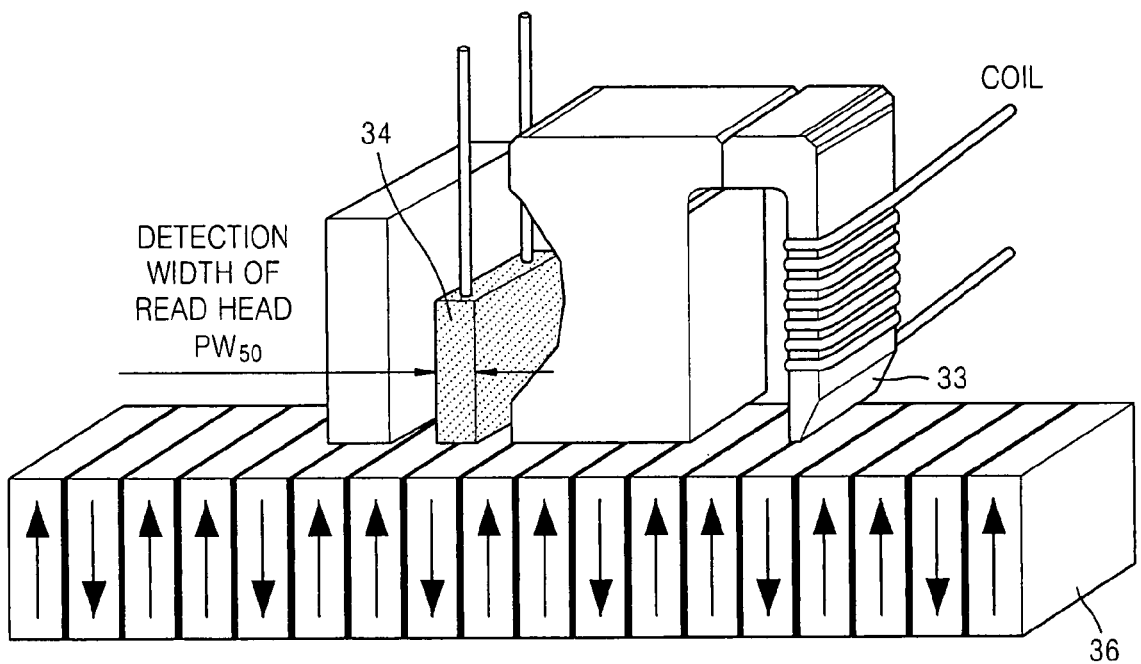
FIG. 2 is a schematic diagram for explaining a conventional perpendicular recording method.
Figure 3:
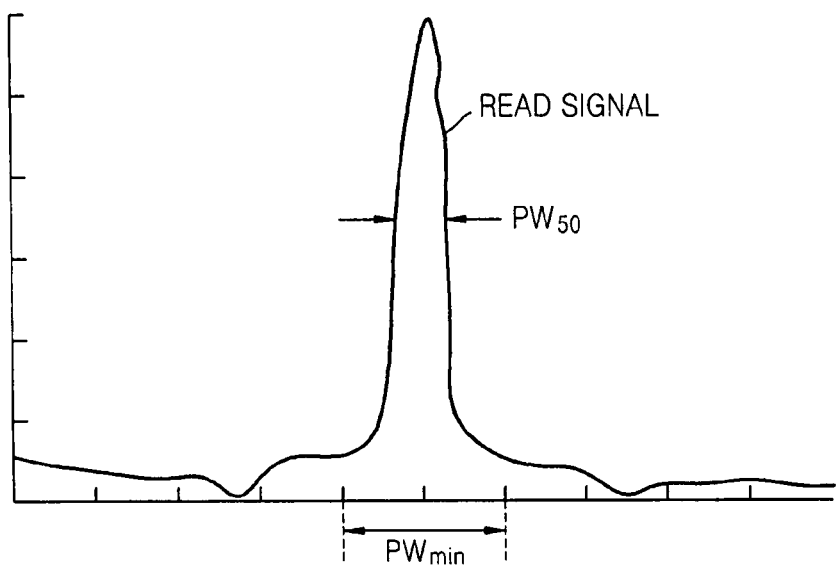
FIG. 3 is a graph showing a correlation between the detection width of a read head and the minimum write width.

The present invention will now be described more fully hereinafter with reference to the accompanying drawings, in which preferred embodiments of the invention are shown. This invention, however, may be embodied in many different forms and should not be construed as limited to the embodiments set forth herein. Rather, these embodiments are provided so that this disclosure will be thorough and complete, and will fully convey the scope of the invention to those skilled in the art. In the drawings, like numbers refer to like elements throughout.

FIGS. 5A through 5C are diagrams for explaining a perpendicular recording method according to an embodiment of the present invention where FIG. 5A shows a data clock, FIG. 5B shows magnetization states of recording layer 36 of disk 12 and FIG. 5C shows magnetization states of recording layer 36 of disk 12. The minimum write width $PW_{min}$ and a frequency T of the data clock are determined by the detection width PW50 of read head 34. Magnetization directions formed on recording layer 36 are uniform in each of first area 52 and second area 54. Although magnetization directions may be uniform in each of a first area 62 and a second area 64, they may not be the same in third area 66. This means that a magnetic flux generated in third area 66 cannot have a high enough intensity to be detected by read head 34 by alternating a magnetic field of a first direction and a magnetic field of a second direction within the width narrower than the minimum write width $PW_{min}$. That is, the intensity of mean magnetic flux detected by read head 34 in third area 66 is actually 0. Thus, a data output of read head 34 is 1, −1, or 0 corresponding to first area 62, second area 64, and third area 66, thereby accommodating the recording of ternary data. Since ternary data can be recorded, a more than three times coding efficiency may be obtained compared to conventional recording methods.

Third area 66 illustrated in FIG. 5C can be formed by applying a signal having a pulse width narrower than the detection width of read head 34 (i.e., a signal having a frequency higher than the highest write frequency) to write head 33. In the high frequency signal, currents corresponding to a first magnetization state and a second magnetization state alternate in a shorter period than the minimum write width $PW_{min}$. That is, the frequency associated with the high frequency signal is more than twice and may be more than four times the highest write frequency of an HDD.

Figures 6A, 6B, 6C, 6D, 6E, 6F:
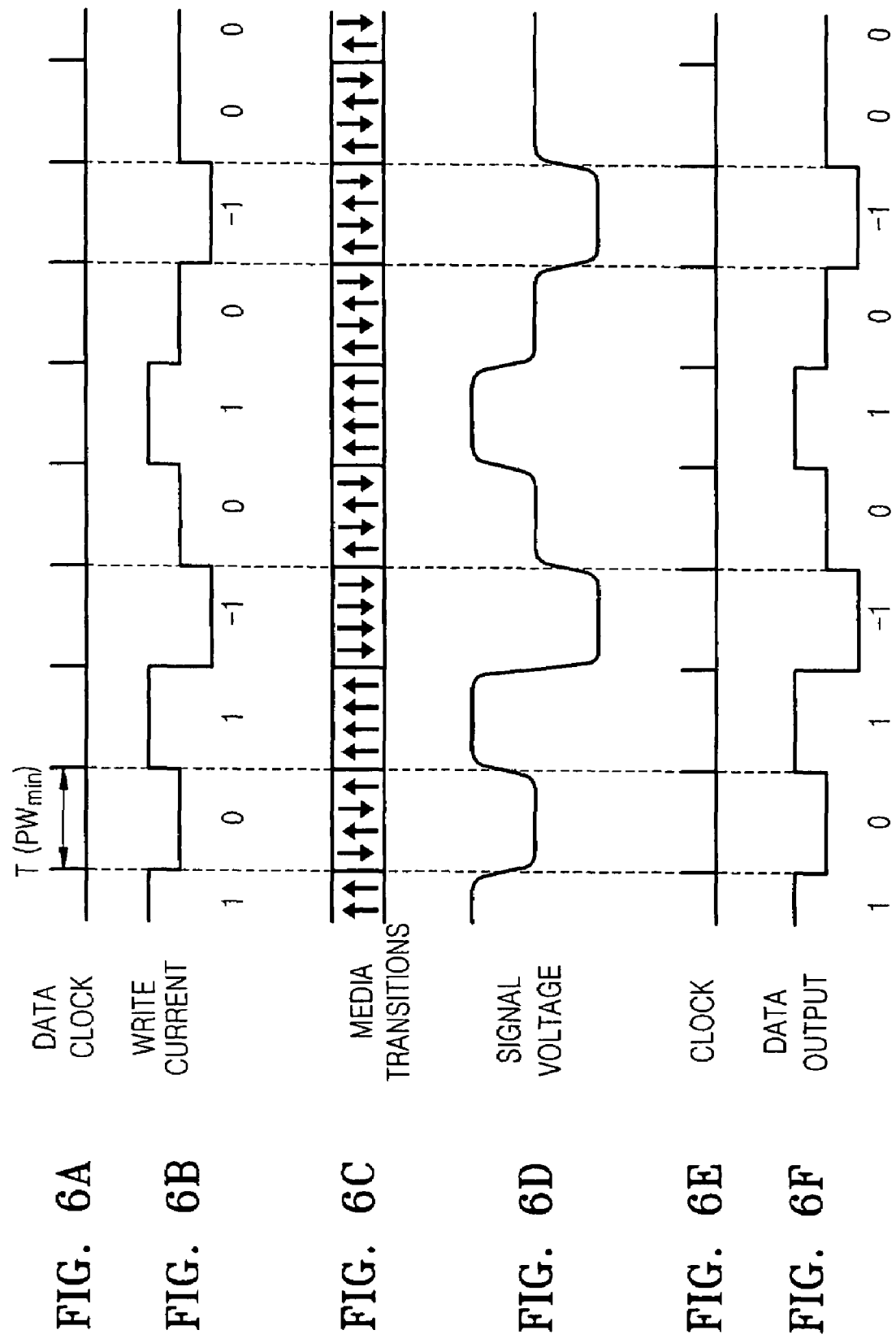
FIGS. 6A through 6F are diagrams for explaining a write current in the recording method according to an embodiment of the present invention.

FIGS. 6A through 6F are diagrams illustrating a write current in the recording method where the data to be recorded is ternary data having values 1, 0, and −1 as illustrated in FIG. 6B. Magnetization states of the recording layer 36 vary according to values of the data as illustrated in FIG. 6C, and the read signal having the amplitude corresponding to the data illustrated in FIG. 6B can be obtained from read head 34 as illustrated in FIG. 6D. In particular, since a high frequency signal, which cannot be detected by read head 34, is recorded in a period T in which the data has a "0" value, the read signal having the amplitude 0 is obtained in the period in which the data to be recorded has a 0 value.

Referring to FIGS. 6B and 6C, a write current in the first (forward) direction is applied to write head 33 in a period in which the data to be recorded corresponds to a "1," a high frequency signal having a predetermined frequency is applied to write head 33 in a period in which the data to be recorded corresponds to a "0." A write current of the second (reverse) direction is applied to write head 33 in a period in which the data to be recorded corresponds to "−1." A pre-amplifier may be utilized Although it is possible to switch a first current and a second current more quickly than the highest write frequency to write head 33 in a period in which the data to be recorded corresponds to "0" as in the prior art, difficulty exists when designing a pre-amplifier. In particular, a separate high frequency signal may be generated and applied to write head 33 only in periods in which the data to be recorded corresponds to a "0." Examples of a high frequency signal are signals used to degauss edges of a burst signal so that the linearity of the burst signal is improved and a signal used to degauss a remaining magnetic field associated with write head 33 after a write operation is finished. A high frequency signal generator used to generate such a high frequency signal may be included in the pre-amplifier.

Figure 7:
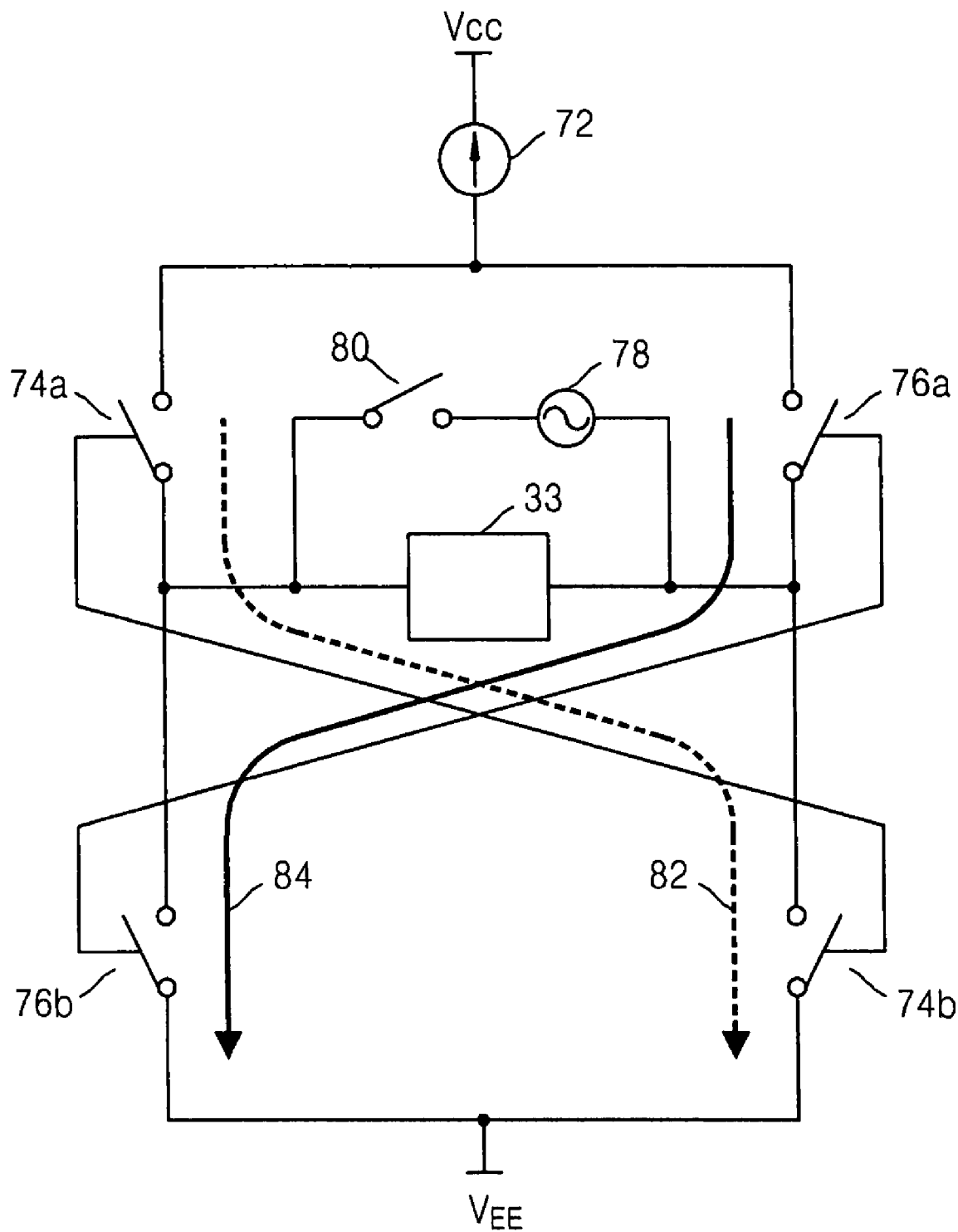
FIG. 7 is a circuit diagram of a pre-amplifier suitable for the recording method according to an embodiment of the present invention.

FIG. 7 is a circuit diagram of a pre-amplifier that includes a DC signal generator 72 that generates a DC signal having a predetermined amplitude, switches 74a, 74b, 76a, and 76b for applying a write current in the first (forward) direction or the second (reverse) direction to write head 33. The pre-amplifier may also include a high frequency signal generator 78 configured to apply a high frequency signal to write head 33 and a switch 80 for applying the high frequency signal to write head 33. Switches 74a and 74b and switches 76a and 76b correspond to the first switch circuit and the second switch circuit respectively. When data corresponds to "1" and "−1," a forward current 82 or a reverse current 84 is applied to write head 33 by DC signal generator 72 and switches 74a, 74b, 76a, and 76b.

The switches 74a, 74b, 76a, and 76b form a bridge circuit where the forward current 82 or the reverse current 84 can be applied to write head 33 by appropriately opening/closing the switches 74a, 74b, 76a, and 76b as illustrated in FIG. 7. The forward current 82 corresponds to the first magnetization state and the reverse current 84 corresponds to the second magnetization state on recording layer 36 of the disk 12. The high frequency signal generator 78 and switch 80 combine to apply a high frequency signal to write head 33 in a period in which data to be recorded corresponds to a "0." Switches 74a, 74b, 76a, and 76b are all open while the high frequency signal is applied to write head 33 by switch 80. That is, the first switch circuit 74a and 74b, the second switch circuit 76a and 76b, and switch 80 operate according to the data to be written on recording layer 36.

Figure 8:
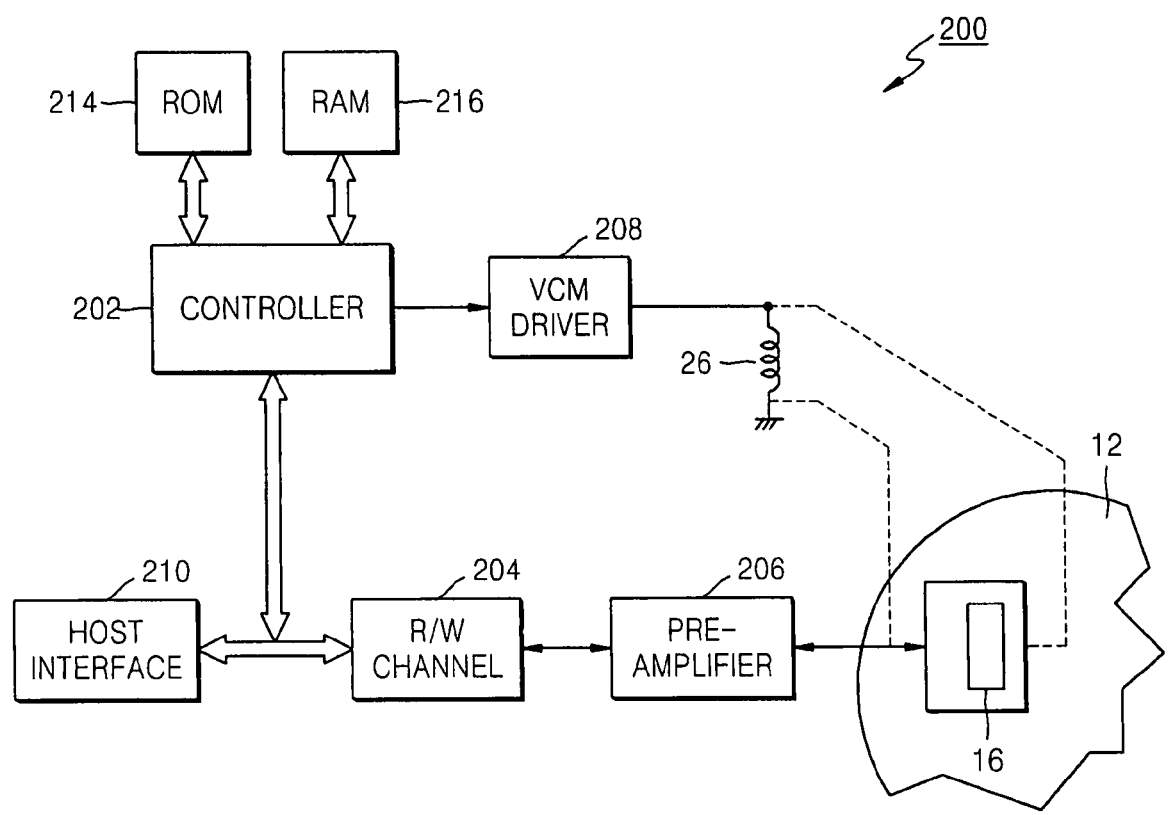
FIG. 8 is a block diagram of a control system for controlling an HDD according to an embodiment of the present invention.

Referring to FIG. 8, a control system 200 includes a controller 202 connected to head 16 through a read/write (R/W) channel circuit 204 and a pre-amplifier circuit 206. Controller 202 may be, for example, a digital signal processor (DSP), a microprocessor, or a micro-controller. Controller 202 provides a control signal to R/W channel circuit 204 to read or write data from or to disk 12. Information is typically transmitted from the R/W channel circuit 204 to a host interface circuit 210 which includes a control circuit (not shown) for interfacing with a system (not shown) such as a personal computer (PC). The R/W channel circuit 204 modulates an analog signal read by head 16 and amplified by pre-amplifier circuit 206 to a host computer-readable digital signal and outputs the digital signal to host interface circuit 210. Alternatively, R/N channel circuit 204 may convert data received via host interface circuit 210 to a disk-recordable write current and outputs the write current to pre-amplifier circuit 206.

Controller 202 is connected to VCM driver 208, ROM 214, and RAM 216. Controller 202 supplies a driving current to voice coil 26 and a control signal to VCM driver 208 to control the activation of VCM 30 and the motion of head 16. A nonvolatile memory, such as a read only memory (ROM) 214 or a flash memory, and a random access memory (RAM) 216 store instructions and data which are used by controller 202 to execute software routines.

In operation, data to be recorded is coded as ternary data and recorded on disk 12 by pre-amplifier 206. This coding operation is performed by RAN channel circuit 204. Pre-amplifier circuit 206 can be configured as illustrated in FIG. 7 and applies a first current, a second current, or a third current (a high frequency signal) to write head 33 according to a value of data input from R/W channel circuit 204. Pre-amplifier circuit 206 applies a DC current generated by a DC current generator to write head 33 in the first direction (i.e., applies the first current to the write head 33) in a period in which data has a first value. Pre-amplifier circuit 206 then applies the DC current generated by the DC current generator to write head 33 in the second direction (i.e., applies the second current to the write head 33) in a period in which data has a second value. Pre-amplifier circuit 206 applies the high frequency signal to write head 33 in a period in which data has a third value.

Although the perpendicular magnetic recording apparatus has been described herein, the present invention may be applied to a longitudinal magnetic recording apparatus (i.e., an apparatus for magnetizing a recording layer by applying a longitudinal magnetic field to the surface of a magnetic recording medium). The present invention can be realized as a method, an apparatus, and/or a system. When the present invention is realized as software, components are embodied as code segments for executing required operations. A program or code segments can be stored in a processor readable recording medium and transmitted as computer data signals combined with a carrier using a transmission medium or a communications network. Examples of a processor readable recording medium include electronic circuits, semiconductor memory devices, read-only memory (ROM), flash memory, erasable ROM, floppy disks, optical discs, hard disks, optical fiber media, and RF networks.

As described above, the recording density of an HDD can be increased by recording ternary data using a characteristic that a signal having a width narrower than the detection width of a read head is not detected by the read head. Although the present invention has been described in connection with the embodiments of the present invention illustrated in the accompanying drawings, it is not limited thereto. It will be apparent to those skilled in the art that various substitution, modifications and changes may be made thereto without departing from the scope and spirit of the invention.

What is claimed is:

1. A perpendicular magnetic recording-method for recording data on magnetic recording medium, wherein the data has a minimum write width corresponding to at least a read detection width of a read head, the method comprising:

perpendicularly recording ternary data in a first area on the magnetic recording medium corresponding to a first data value, the data recorded in the first area having a first magnetization state which continues at least during the minimum write width;

perpendicularly recording ternary data in a second area on the magnetic recording medium corresponding to a second data value, the data recorded in the second area having a second magnetization state which continues at least during the minimum write width, the second magnetization state being oppositely magnetized from the first magnetization state; and perpendicularly recording ternary data in a third area on the magnetic recording medium corresponding to a third data value by alternating the first magnetization state and second magnetization state, each having a write width narrower than the minimum write width.

2. The method of claim 1, wherein third area is formed by alternating the first magnetization state and the second magnetization state, each having a write width narrower than ½ the minimum write width.

3. The method of claim 1, wherein the third area is formed by alternating the first magnetization state and the second magnetization state, each having a write width narrower than ¼ the minimum write width.

4. The method of claim 1, wherein the intensity of a mean magnetic flux detected by the read head in the third area is 0.

5. A perpendicular magnetic recording-method for recording ternary data on magnetic recording medium, wherein the data is recorded according to a minimum write width corresponding to a read detection width defined in relation to a read head, the method comprising:

perpendicularly recording ternary data in a first area on the recording medium magnetized according to a first magnetization state, such that the intensity of magnetic flux detected by a read head from the magnetic recording medium corresponds to a data value of;

perpendicularly recording ternary data in a second area on the recording medium magnetized according to a second magnetization state, such that the intensity of magnetic flux detected by the read head from the magnetic recording medium corresponds to a data value of 1; and perpendicularly recording ternary data in a third area on the recording medium magnetized according to the first and second magnetization states, such that the intensity of magnetic flux detected by the read head from the magnetic recording medium corresponds to a data value of 0, and each one of the first and second magnetization states magnetizing the recording medium in the third area is recorded with a width narrower than the minimum write width.

6. A pre-amplifier circuit applying a write current to a write head during a perpendicular magnetic recording method to record data having a minimum write width corresponding to a detection width of a read head, the pre-amplifier circuit comprising:

a direct current (DC) signal generator generating a DC signal having a predetermined amplitude;

a first switch circuit applying the DC signal from the DC generator to the write head in a first direction during a period in which the data to be recorded has a first value;

a second switch circuit applying the DC signal from DC generator to the write head in a second direction opposite to the first direction during a period in which the data to be recorded has a second value;

a high frequency signal generator generating a high frequency signal having a higher frequency than a write frequency corresponding to the minimum write width; and a third switch circuit applying the high frequency signal to the write head during a period in which the data to be recorded has a third value.

7. The pre-amplifier circuit of claim 6, wherein the first, second and third switch circuits operate according to the value of the data.

8. A magnetic recording apparatus comprising:

a write head generating a magnetic field for perpendicularly magnetizing a magnetic recording medium with respect to an upper surface of the recording medium; and a pre-amplifier circuit having a direct current (DC) signal generator which generates a DC signal having a predetermined amplitude, and an alternative current (AC) signal generator, which generates a high frequency signal having a higher frequency than a write frequency corresponding to a write width of a read head, and supplying a write current corresponding to data to be recorded by the write head, wherein the pre-amplifier circuit applies the DC signal to the write head in a first direction during a period in which the data to be recorded on the magnetic recording medium has a first value, the pre-amplifier circuit applying the DC signal to the write head in a second direction during a period in which the data to be recorded has a second value, and the pre-amplifier circuit applying the high frequency signal to the write head during a period in which the data to be recorded has a third value.

* * * * *